March 18, 1969 B. P. LOKEY ET AL 3,433,135
BAG INSPECTION METHOD AND APPARATUS THEREFOR
Filed Oct. 31, 1966 Sheet 1 of 5

INVENTORS
Burke P. Lokey
Charles R. Rein

BY Arthur Schwartz
ATTORNEY

United States Patent Office 3,433,135
Patented Mar. 18, 1969

3,433,135
BAG INSPECTION METHOD AND APPARATUS THEREFOR
Burke P. Lokey, Metairie, and Charles R. Rein, Gretna, La., assignors to West Virginia Pulp and Paper Company, New York, N.Y., a corporation of Delaware
Filed Oct. 31, 1966, Ser. No. 590,850
U.S. Cl. 93—8    34 Claims
Int. Cl. B31b 1/00

The invention relates to an inspection method and apparatus, and more particularly to an inspection system for the manufacture of folded bags, envelopes or the like.

In the manufacture of folded bags and the like, it has been found that existing and prior art inspection systems have not been completely satisfactory. Since the bags move through the forming machine at the rate of 30–120 bags per minute, a quality control system that detects errors as they occur is much more desirable than examining the finished product. Further, it is desirable to have a quality control system that will eliminate certain processes from being performed on a defective bag, as well as merely rejecting it at the final stage of manufacture.

In general it can be stated that the prior art detected excess or misplaced material only and controlled the quality with this information only. This invention not only detects excess or misplaced material, but also lack of material. Thus, the quality of the product is improved since few if any defective bags actually wind up in the hands of purchasers.

Objects

It is therefore an object of the instant invention provide an in-process bag inspection system.

It is a further object to provide a bag inspection system that may be flexible enough for use on a large variety of bag sizes, from the very large down to envelope size.

It is still a further object to provide a bag inspection system which will operate on high speed machines that can form bags at a rate of over 100 per minute.

It is another object to provide a bag inspection system which will sense the quality of a bag at a first location and if necessary, will eliminate certain subsequent operations on the bag. One advantage of detecting a flaw in the bag before it reaches any pasting or gluing operations is that when a bag is incorrectly formed, paste is applied by the machine at improper locations. Not only will the improperly pasted bag be unusable, but the succeeding bag will invariably become pasted to the defective bag. This not only makes the defective bag unusable, but also the succeeding bag. Further, when two or more bags or envelopes become glued together as with present equipment, there is a tendency for the machine to become clogged causing a pile up. Therefore, this invention reduces costs by avoiding waste and spoilage.

It is another object of the invention to provide an inspection system which will permit the defective bags to be reclaimed and reworked prior to any paste applications on the bags.

It is a further object of the invention to provide a photocell inspection system which can be adjusted in order to accommodate bags or receptacles of various sizes, shapes and material.

Another object is to provide a photocell inspection system which facilitates the physical positioning of photocells.

It is still a further object of the invention to provide a photocell inspection unit utilizing a minimal number of transducers or photocell units.

Another object is to provide means whereby the predetermined positioning of the photocells will define an acceptable fold deviation or tolerance from the absolute or exact bag fold.

A further object of the invention is to provide a reflecting surface and bag arrangement for illuminating photocells positioned in a reading zone wherein a direct source of illumination cannot be utilized by virtue of the reading line location in relationship to the physical boundaries of a bag form.

A further object is to provide a photocell sensing system for bags which will not only detect excess paper to indicate a defective bag (such as some of the prior art), but will also detect whether the paper is improperly placed or missing.

It is still another object of the invention to provide a bag inspection system which may be used on bags of various thicknesses, from single ply to multi-ply bags.

It is another object of the invention to provide means for signaling to the workmen that defective bags are being produced and at what rate.

It is still a further object to provide a photocell inspection system with the inspection units arranged so that a minor misalignment of the travel of the bags will not affect the inspection operation. Consequently, if the high speed movement causes the bags to skew slightly, the unit will not incorrectly indicate that the bag is faulty.

Before going into a description of one form of the invention as it is incorporated in a bag manufacturing machine, it should be pointed out that the inspection unit and the photocell operated logical system and memory unit has utility outside of the bag forming art. It is to be further noted that although the transducers are shown as photocell units, other transducers of, for example, a hydraulic or fluid nature, could be utilized.

Summary of the overall device

The invention generally includes an automatic bag forming machine having a series of forming operations, at least one pasting operation, subsequent forming operations and finally, a discharge of the finished bag and pertaining specifically to the inspection means which detects defects in the bags including too much material, misplaced material and too little material.

The first inspection unit examines the bag as it has been folded prior to that point. The output of the inspection station transducers is fed into a control sensing logic unit. If a flaw is detected at the first station, an output is generated from the logic unit into a memory unit. The memory unit then feeds a signal to a subsequent station or stations where pasting or the like occurs. When the faulty bag reaches this station, a signal will be present which deenergizes that operation and prohibits any work done on the faulty bag at that point. Obviously, the memory unit could direct that no succeeding operation is to be performed on a faulty bag.

The second inspection station and control sensing unit will likewise perform the same function, feeding an output into the same memory unit. The memory unit will feed a signal to the bag ejection unit (which is just prior to the bag discharge station), and the bag ejection unit will eject the faulty bag as a result of an output from either or both inspection units.

The positioning and number of photocells for example are important aspects of this invention.

The above and other objects and advantages of the invention will readily become apparent from the following detailed description, taken together with the drawings wherein.

*Broad description of the forming and inspection of a bag*

Figure 1:
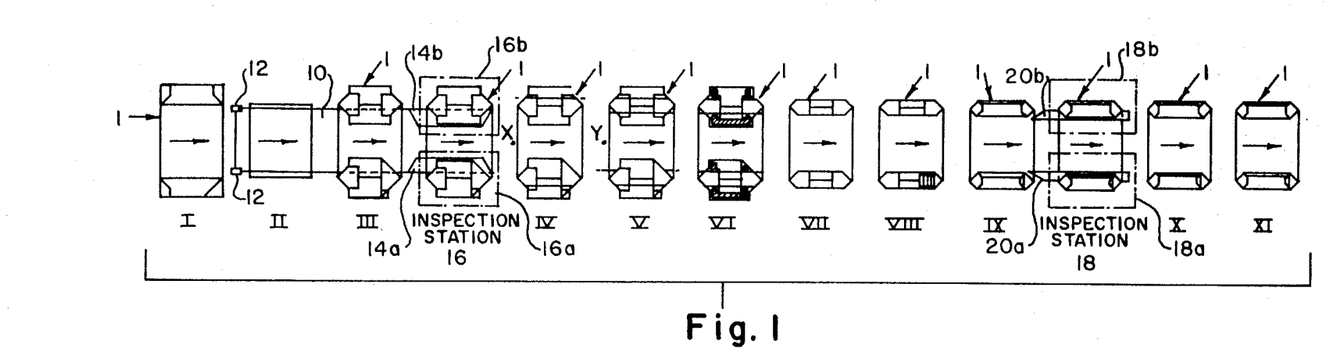
FIGURE 1 is a schematic showing of the bag at its various stages in forming the bottom thereof, together with a schematic representation of the inspection photocell units.

Referring now particularly to FIGURE 1, bag 1 in the process of being formed moves through the several stations indicated by Roman numerals I–XI and by the legends below the diagram at each stage. It first moves through a main scoring station I to a station II where the ends are lifted. The ends of bag 1 are lifted over a guide bar 10 which is supported on a plurality of bracket members 12. A pair of mirrors 14a and 14b are positioned to extend past the end of bar 10 as will be discussed below.

The first major operation is performed at a bottom opening station III which is the third location on the diagram. Between the bottom opening station III and a station IV where the outside flap is scored, is located a first inspection station 16.

The inspection station 16 in reality consists of two identical inspection stations or reading zones 16a and 16b. These two stations operate somewhat independently of one another. This is so that if the bag should be skewed slightly, each side of the bag will be inspected independently. Thus, slight misalignments will not give incorrect indications of a faulty bag.

The bag next passes through an outside and an inside flap scoring station IV and V. It is understood that the inspection unit could be placed after any station where it is desired to take a reading on the bag formed thus far.

Paste is applied to the bag at a station VI. As will be discussed later, if the bag has been incorrectly formed, it is not desirable to have paste applied.

At a station VII the flaps are lifted, while at station VIII a sleeve is inserted and pasted. Again, a pasting operation also occurs at station VIII. Therefore, if the bag has been incorrectly formed, this operation is also not desirable.

At a station IX another major folding operation occurs in that the bottom is closed.

Therefore, immediately after station IX, there exists a second inspection unit 18 which includes a pair of inspection stations 18a and 18b. In like manner, a pair of mirrors 20a and 20b are positioned under the bag portion which is folded over a guide bar (not shown) similar to bar 10. The mirrors both at the first and second stations are suspended from the machine as well as connected to guide bars or the like. As shown in FIGURE 1, the mirrors 14a and 14b supported by the guide bar 10 serve two functions. The mirrors 14a and 14b are automatically inserted beneath the flap. This operation may be accomplished by directing an air blast at the flap. Thus, the reflective or mirrored surface of the mirrors 14a and 14b serve primarily to reflect a source of light to photocells incapable of receiving a direct source of illumination. Moreover, the mirrors 14a and 14b may be utilized in prior manufacturing steps to facilitate certain folding operations.

Finally, faulty bags are ejected at a station X while the goods bags are discharged from a station XI.

*Schematic showing of photocell and bag station*

Figure 1A:
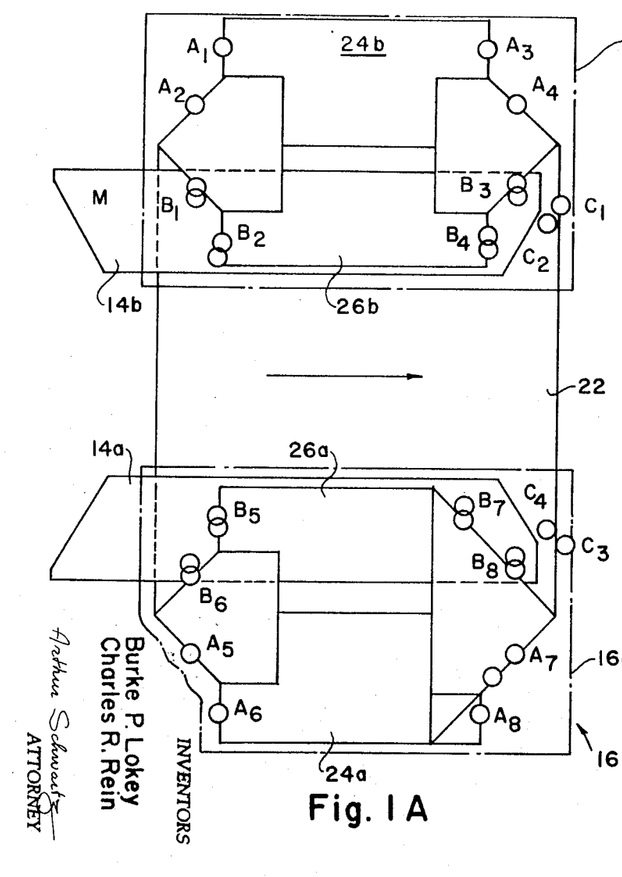
FIGURES 1a and 1b are enlarged schematics of the inspection stations.
Figure 2:
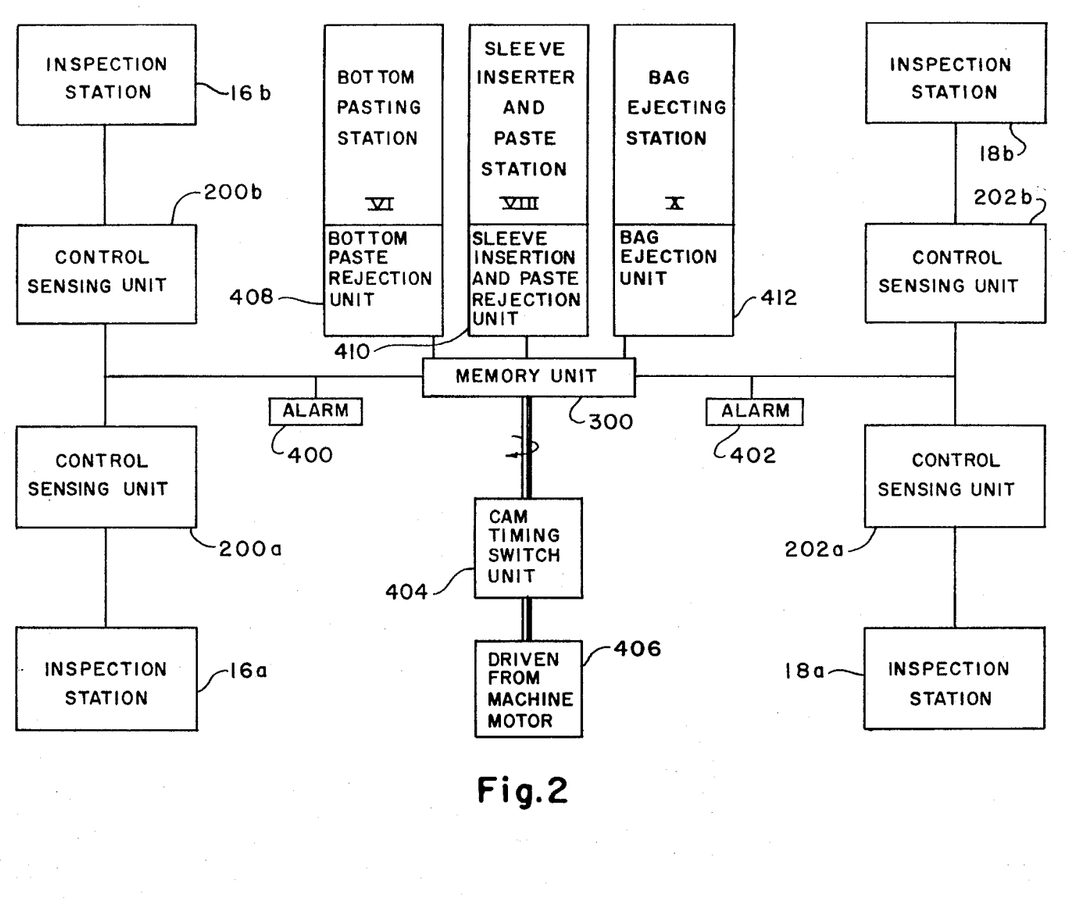
FIGURE 2 is a block diagram of the entire system.

Referring now particularly to FIGURES 1a and 2, a first inspection station 16a will be considered. The bag 1 has a center section seen generally at 22 and an outside flap 24a. An inside flap 26a is seen positioned over a portion of the mirror 14a. Corresponding portions on the other half of the bag are denoted with the letter b.

Figure 1B:
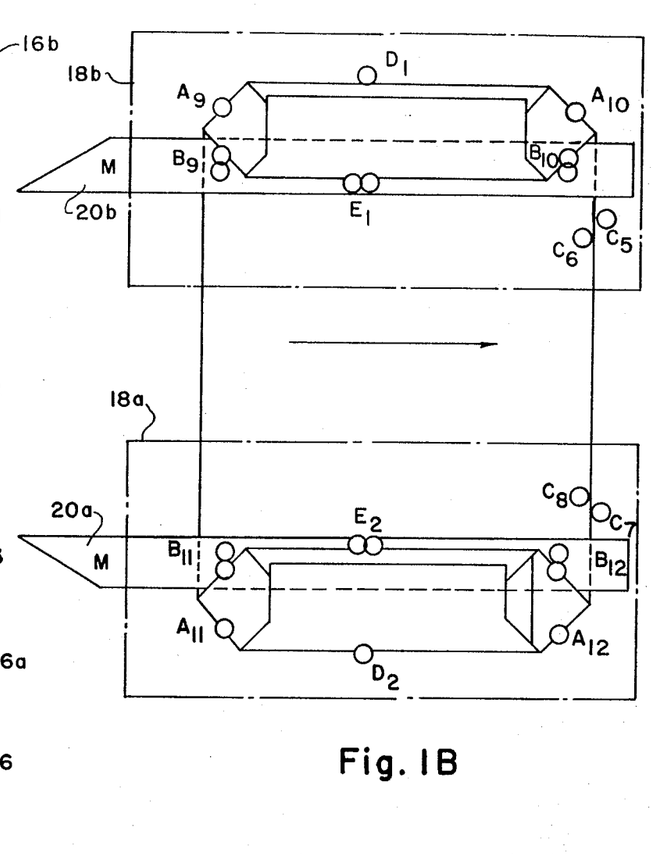
Figure 3:
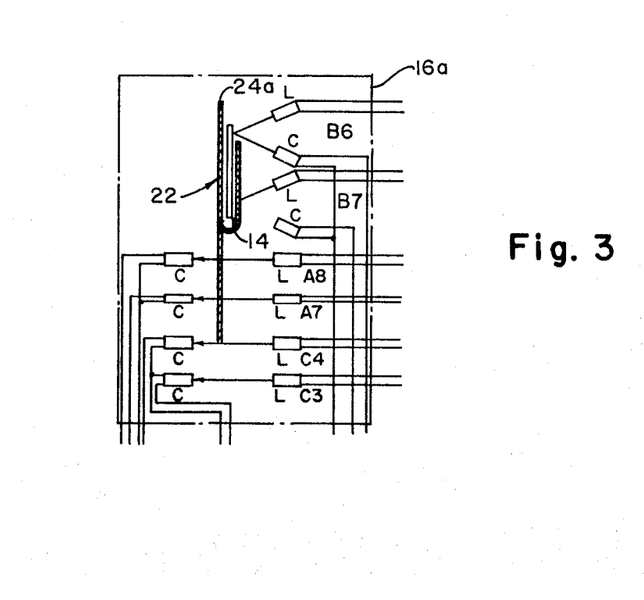
FIGURE 3 is a schematic showing of the photocell arrangement at a bag inspection station.

It will be seen from FIGURES 1a, 1b and 3 that elements A1 . . . A12 have light portions L and cell portions C arranged in straight line fashion, while the light from the lamps of B1 . . . B12 reflect off the mirrors 14a, 14b and 20a, 20b. The lights B6 and B7 are designed to reflect off the mirror when no portion of the flap 26a covers the mirror, while lamps C3, C4, A7 and A8 are designed to coact with cells on the opposite side of the bag and will not reflect off any mirrored surface. It will be appreciated that in FIGURES 1a and 1b, those photocell units indicated with the notation B1 . . . B12 (at the several stations) and E1 and E2 (at the second station) all are indicated by two dots. The remainder of the cells and lamps are indicated by only one dot since the cell will be located directly below the lamp.

The significance and operation of the lamps and cells will be discussed in greater detail below.

For the purpose of later discussion, it will be seen that units C1 . . . C8 are the photocell units which will control the logic process in the control sensing unit. Cells A3, A4, B3, B4, B7, B8, A7, and A8 at the first inspection station and A10, B10, B12, and A12 at the second inspection station are the error lead photocells. In like fashion, cells A1, A2, B1, B2, B5, B6, A4, and A6 at the first unit and A9, B9, B11, and A11 at the second unit are the error lag photocells.

At the second inspection station, cells D1, E1, and E2 and D2 are photocells which will measure lateral deviation of the bag. These will feed into the logic system in the same manner as the error lead and lag photocells.

*Description of the overall operation*

Referring now particularly to FIGURE 2, the first inspection stations 16a and 16b which include the various photocells and lamps seen in FIGURE 1 appear as a pair of blocks. The outputs of the photocell inspection units 16a and 16b are respectively fed into a pair of identical control sensing units 200a and 200b. The control sensing units include logic circuitry discussed in greater detail below.

If the inspected bag is within the accepted tolerances, there will be not signal output from the control units 200a and 200b. If however there is one or more faults in the bag construction as sensed by an inspection station, an output will emanate from either or both of the control units and will be fed to a memory unit 300.

Between the control units and the memory units may be positioned an alarm 400 which will give off an audible or visual signal every time a bag is rejected. In this manner, the operator will be able to tell when a fault occurs and also at what frequency. If there has been a malfunction of a general nature, rather than a random fault, the alarm will be actuated almost continuously, and the operator may immediately shut down the machine. It will be appreciated that in this manner a great volume of faulty bags will not be produced before notice of the malfunction has been given.

Similar inspection stations 18a and 18b and a pair of control sensing units 202a and 202b are located at the second inspection station 18. Another alarm 402 may be located between this inspection unit and the memory unit 300. It will therefore be apparent to the operator whether or not the fault has occurred before the first inspection station or between the first and second inspection stations. This will enable him to determine the cause of the malfunction more readily.

In order for the memory unit to be coordinated with the operation of the machine, a cam timing switch unit (which will be discussed in detail below in relation to the memory unit) is seen at 404. This in turn is driven from a drive taken off the driving means for the machine as indicated generally at 406.

Connected to the memory unit 300 is a first paste rejection unit 408. This controls the operation of the bottom pasing station VI. A second rejection unit 410 at the sleeve insertion and paste station VIII is also connected to the memory unit. Finally, a faulty bag ejection unit 412 is connected to the memory unit.

Overall operation of the inspection unit

Referring now to FIGURES 1–3, the bag moves along through the first three stations to inspection unit 16. The front edge of the bag will cross all of the lead and lag photocell elements until the control photocell C4 on inspection station 16a and control photocell C2 on inspection station 16b are broken. Photocells C2 and C4 are darkened prior to photocells C1 and C3. While C2 and C4 are dark and C1 and C3 are light, a reading zone is defined. Considering unit 16a only, the control photocells C3 and C4 provide inhibiting signals with respect to the control sensing unit 200a. At this time (as will be discussed in detail below) the outputs from leading and lagging error photocells are ineffective to generate error signals to the memory unit.

Generally, the logic system in the control sensing unit 200a will send an output to the memory unit 300 if a bag is faulty, and at the same time set off the alarm 400. The output from the control unit is stored in the memory unit. A signal is sent out from the memory unit to the bottom paste rejection unit 408 when the faulty bag reaches station VI. In the meantime, the bag goes through the outside and inside flap scoring stations IV and V. When the bag reaches station VI, no bottom pasting will be done since the signal from the memory unit 300 will control this operation. The bag then moves on, and even though it may be defective, the flaps will be lifted at station VII.

The next critical station the bag reaches is the sleeve insertion and pasting station VIII. Again, by means of the memory unit 300 in conjunction with the cam timing switch unit 404, a signal will be sent to the sleeve insertion and paste rejection unit 410 and no pasting will be done.

The next station which is the bottom closing station IX performs the next major function. Therefore, the second inspection station 18 is located after station IX. In the same maner, the bag is inspected. Besides the inspecitions which are similar to those at inspection station 16, additional photocells D1, D2, E1, and E2 are used to measure lateral deviation of the bag.

The output of inspection stations 18a and 18b are fed into control sensing units 202a and 202b in the same manner and then to the memory unit 300. If a signal for a particular bag has reached the memory unit from either inspection and control station, a signal will be sent out to the bag ejection unit 412 at station X. Therefore, any faulty bag will be ejected at station X while all of the good bags will go on to bag discharge station XI.

It is obvious that bag ejection units could be placed after each inspection station or at each rejection point.

Summary of the electrical control sensing circuitry

Figure 4:
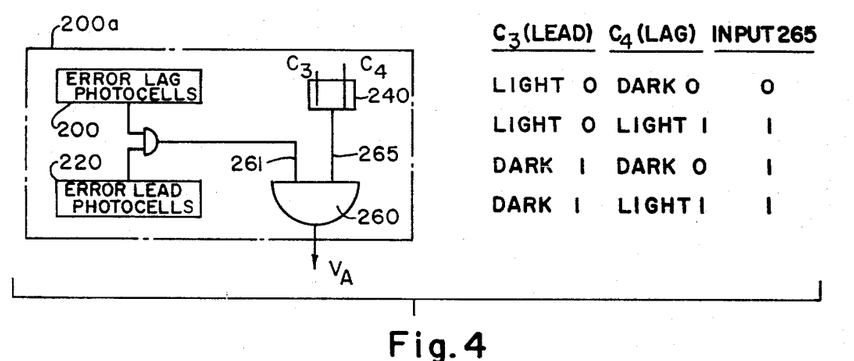
FIGURE 4 is a schematic showing of logic operation of the control sensing unit.

Whenever either the error leading photocells or the error lagging photocells are initiated and produce an output pulse (as discussed in detail below) prior to the arrival of the bag in a predetermined reading zone, a bag flap has been malformed. However, when the manufacturing process has created a properly aligned flap, the error lead photocells and the error lag photocells will be initiated to produce an output pulse only when the bag has arrived in the predetermined reading zone. Control photocells are responsive to the position of the bag in order to define the predetermined reading zone. The basic circuitry provided to perform this sensing operation is schematically shown in FIGURE 4. Control photocells are connected to a photocell OR circuit. When the bag has arrived in the predetermined reading zone, the output of the photocell OR circuit will be turned off or in a low state, thus disabling one input to an AND circuit. Consequently, the outputs produced by the error leading photocells and the error lagging photocells and connected to the other input of the AND gate will not be passed by the AND gate. In the event that a malformed bag flap has been produced, outputs from the error lead photocells or the error lag photocells will energize the input to the AND circuit prior or subsequent to the arrival of the bag in the predetermined reading zone. Concurrently either one or the other or both of the control photocells will turn on the photocell OR gate to produce a one or high output and thus enable the AND gate. Consequently a high or positive pulse is produced at the output of the AND gate, indicative of a malformed bag flap.

Detailed description of sensing circuitry

Figure 5:
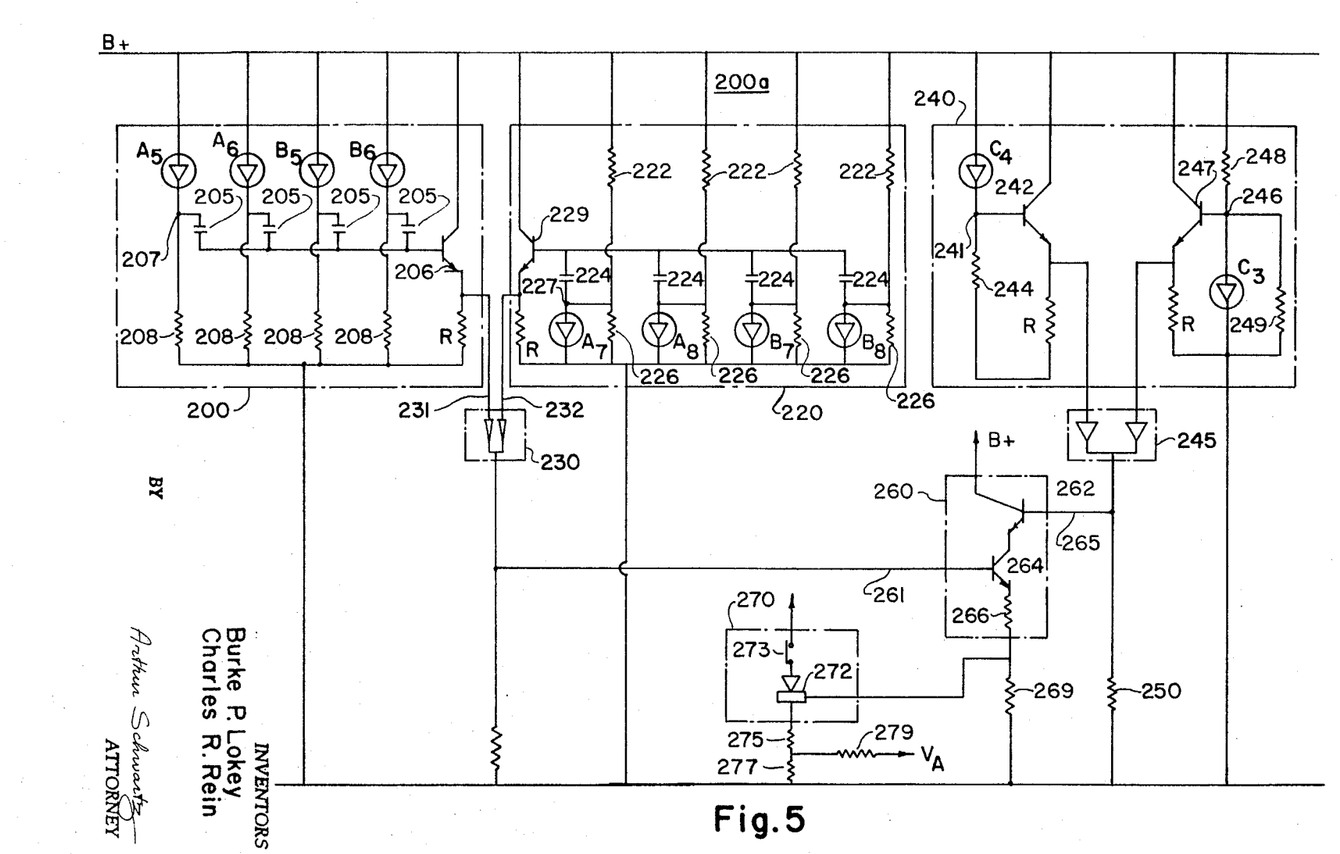
FIGURE 5 is a detailed schematic drawing of the circuitry in the control sensing unit.

FIGURE 5 is an example of one possible embodiment of the control sensing unit 200a shown broadly in FIGURE 4, and wherein like reference numerals are used to indicate identical elements. The outputs from an error lag photocell unit 200 and an error lead photocell unit 220 are connected to an OR gate 230 having an input 231 and 232 (FIGURE 5). The output of control photocell unit 240 is conected to one input of an AND gate 260. The output from the AND gate 260 is connected to the input of a starter circuit 270 (FIGURE 5). When a proper fold or flap has been made on the bag, hereinafter referred to generally, the starter circuit 270 will produce an output Va which is in a low state. On the other hand, when a malformed flap has been produced, the starter circuit 270 is effective to pass a high signal from the AND gate 260 to the output Va in a high or positive state. This error signal is then transferred to the memory unit 300 for subsequent control of other machine operations.

Now referring to the error lag photocell unit 200, the electrical connections for one photocell arrangement, for example as shown at 16a in FIGURE 1, will now be described. Positive logic is used, but it is appreciated that negative logic could be utilized. Photocells A5, A6, B5 and B6 are connected on one side to a source of voltage B+. Coupling capacitors 205 each individually connect the other terminals of photocells A5, A6, B5 and B6 to the input of a switching transistor 206. By way of example it can be seen that when a cell is illuminated for example the photocell A5, that a junction 207 between a resistor 208 and the photocell A5 rises towards the value of the B+ voltage, thus generating a positive pulse through coupling capacitor 205. This positive pulse is then passed by the switching transistor 206 to an input 231 of the OR gate 230. In this particular arrangement, the switching transistor 206 is arranged in an NPN configuration; however, it is readily appreciated that a PNP type transistor could be used. This operation is naturally applicable to the photocells A6, B5 and B6. On the other hand, whenever any of the error lag photocells become darkened, the junction formed by the connection of the coupling capacitor 205 and the resistor 208, the photocell A5 becomes negative. In this instance, no positive pulse is passed to the input 231 of the OR gate 230. Thus, it can be seen that whenever any of the error lag photocells A5, A6, B5 and B6 pass from a dark to an illuminated state, positive pulses will be passed to OR gate 230.

In contradistinction, it is seen that the error lead photocell unit 220 produces positive pulses whenever any of the photocells A7, A8, B7 or B8 pass from an illuminated to a darkened state. The resistors 222 are connected on one side to the B+ voltage and on their other side to a junction formed by coupling capacitors 224, resistors 226, and the individual photocells A7, A8, B7 and B8. When the photocells are illuminated, a junction point 227 is negative, since most of the voltage drop occurs across resistor 222. However, when photocell A7 is darkened, the potential at the junction 227 will rise relative to its previous potential. A positive voltage pulse is then transmitted through the coupling capacitor 224 to the input of a switching transistor 206. Thus, it can be seen that the error lead photocell unit 220 is effective to pass positive pulses to an input 232 of the OR gate 230. The outputs from the OR gate 230 are connected to an input 261 of the AND gate 260 and comprise a pair of transistors 262 and 264.

The photocell OR circuit 240 containing control photocells C3 and C4 produces an output to gate an input 265 to a high or positive state except when the bag is located in the predetermined reading zone. In this instance, the predetermined reading zone occurs when the leading control photocell C3 is in an illuminated state and the lagging control photocell C4 is in a darkened state. Whenever C4 is illuminated, a junction 241 formed by the base terminal of a transistor 242 and a resistor 244 will be positive to produce a positive pulse at the output of the transistor 242 and a load resistor R. This positive pulse is then passed by an OR gate 245 connected to resistor 250 to enable the AND gate 260. On the other hand, when the control photocell C4 is in a darkened state the base terminal of transistor 242 is biased in a negative condition, thus no pulse is passed to the AND gate 260. The other stage of the photocell OR gate 240 formed by the photocell C3 is connected in a complementary manner. Whenever the control photocell C3 is in a darkened condition, a junction 246 formed by the base terminal of a transistor 247 and a pair of resistors 248 and 249 is positively biased to gate a high or positive output pulse at the load resistor R of the transistor 247. Similarly, whenever the control photocell C3 is in an illuminated state, the base terminal of the transistor 247 will be biased negatively and thus no output pulse will be produced at the load resistor R of the transistor 247. Whenever the AND gate 260 is enabled, that is inputs 261 and 265 are high, starter circuit 270 is energized to produce an output pulse Va. The output pulse at Va is indicative of a malformed bag and is accordingly stored in the memory circuit 300, hereinafter described, in order to control machine operations. A positive pulse produced at the junction of a pair of resistors 266 and 269 will gate a silicon controlled rectifier 272, biased through a cam switch 273, to an "on" position to produce a positive output pulse Va at the junction formed by a plurality of resistors 275, 277, and 279.

*Operation of the electrical control sensing unit*

It is the function of the control sensing unit to produce a positive output Va whenever an improperly formed flap has been made on a bag. Firstly, let it be assumed that the bag is in the predetermined reading zone, that is, as shown at 16a in FIGURE 1. In this instance, the control photocell C3 will be in an illuminated state and the control photocell C4 will be in a darkened state, as previously described with reference to the photocell OR circuit 240. No output pulse will be generated at the OR gate 245. Hence, the input lead 265 to the AND gate 260 is disabled. Therefore, any input pulses produced by the error lag photocells 200 or the error lead photocells 220 and connected to the other input of the AND gate 260 at the terminal 261 will not pass to produce an output pulse. A low output from the AND gate 260 indicates that the flap on the bag has been properly formed and no further machine control modifications are necessary.

Conversely, let it be assumed that the bag is not in the predetermined reading area. In this position one of the three possible situations may exist: the control cell C3 is illuminated and the control photocell C4 is also illuminated; the control photocell C3 is darkened and the control photocell C4 is also darkened; or finally, the control photocell C3 is darkened and the control photocell C4 is illuminated. When any of these three instances occur, a positive bias will be produced from photocell OR gate 240 to enable the input 265 of the AND gate 260. During this time interval the AND gate terminal 265 is enabled; any positive pulses produced by either the error lag photocells 200 or the error lead photocells 220 will energize the terminal 261 of the AND gate 260 and pass the high or positive output pulse Va which is indicative of a malformed flap. This error signal Va is then stored in the memory unit 300 in order to control subsequent stages of the bag manufacturing process.

*Summary of memory circuit and cam operated switch*

As previously described, any error signals produced by any of the control sensing units are stored in the memory unit for the purpose of omitting subsequent pasting operations in the manufacturing process, or for initiating alarms or counters. As the bag travels to different stages of the manufacturing process, the memory unit and attendant cam operated switches are effective to synchronously deliver a machine control output pulse at any desired stage of operation.

*Detailed description of the memory unit and cam operated switches*

Figure 6:
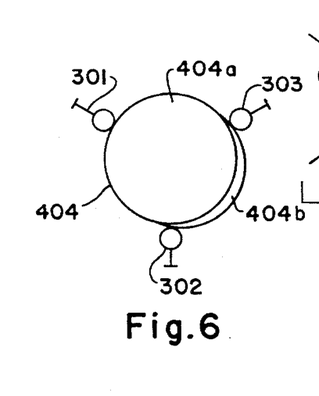
FIGURE 6 is a schematic diagram of the cam timing switch unit.

As shown in FIGURE 6, a cam unit 404 is operative to control a plurality of cam operated switches 301, 302, and 303, each of which is opened and closed once for each cycle of operation of the machine. The cam structure 404 is formed of a circular element 404a and a second arcuate camming portion 404b of 150°. One cycle of operation is defined as the time necessary for the trailing edge of the bag to pass from one designated station to a similarly located position in the next subsequent station. For example, the length of time for a point X shown at the station IV to pass to a point Y at the station V would be defined as one machine cycle. The switch 303 is arranged to stay closed for approximately 150° of one cycle. The switch 302 closes just before the switch 303 opens and also stays closed for approximately 150° of a machine cycle due to contact with the 150° arcuate portion 404b of the cam structure 404. In like manner, switch 301 closes just before switch 302 opens and stays closed for 150° of a machine cycle.

Figure 7:
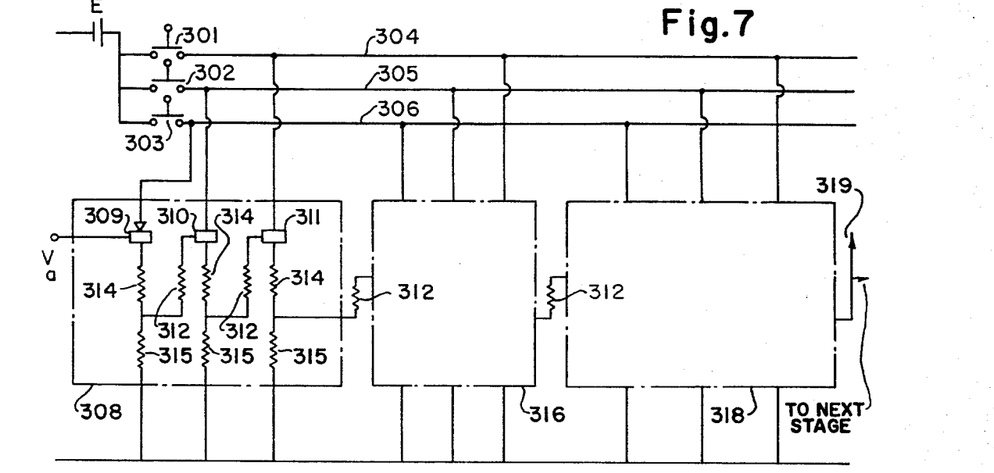
FIGURE 7 is a schematic diagram of the memory unit.

This arrangement is used to cycle the error signal Va through the memory circuit 300 shown in FIGURE 7. In FIGURE 7, a source of voltage E is connected to a line 304 by the cam switch 301, to a line 305 by the cam switch 302, and to a line 306 by the cam switch 303. The first stage of the memory unit is shown at 308 and consists of three silican controlled rectifiers, hereinafter denoted as SCR, indicated as 309, 310, and 311. With the cam limit switch 272 in the starter circuit 270, shown in FIGURE 5 closed, SCR 272 will produce a gating pulse Va at the stage 308. Since the switch 303 is closed, the SCR 309 will be energized. Upon energization of the SCR 309, a coupling resistor 312 connected to the junction of a load resistor 314 and 315 is effective to enable the SCR 310. However, the SCR 310 will not turn on until switch 302 is in a closed position. As the cam 404 rotates approximately 150°, switch 302 will close while the switch 303 remains closed. This operation insures that the signal on the SCR 309 will not be lost. Following the closure of the switch 302, the switch 303 will open and therefore the signal will have been transferred from the SCR 309 to the SCR 310. In a similar manner, the switch 301 will be closed while the switch 302 is also closed. At this time, both the SCR 310 and the SCR 311 are energized. Subsequent to the closure of the switch 301, the switch 302 will open and deenergize the SCR 310; hence, the signal has now been transferred to SCR 311. In this example, the passage of the signal Va from the SCR 309 to the SCR 311 indicates that the bag has traveled from one station to the next succeeding station. A pair of stages 316 and 318 is identical to the stage 308. It is appreciated that the required number of stages is determined solely by the number of different machine operations utilized in the bag manufacturing process.

Operation of memory unit

By way of example, it can be seen that the passage of an error signal Va from the SCR 309 to the SCR 311 would be indicative of a bag having traveled from the inspection station 16 to the outside flap scoring station IV. Likewise, as the signal is transferred from the input of the stage 316 to the output of the stage 316, the bag would have traveled from the ouside flap scoring station IV to the inside flap scoring station V. Finally, the passage of the error signal through the stage 318 would indicate that the bag had reached the bottom pasting station VI. At this time an output signal 319 could be derived from stage 318 in order to inhibit the bottom pasting operation. It is also appreciated that this error signal could be used to initiate a defective bag counter (not shown) in order to determine the number of improperly formed bags. Finally, it is to be mentioned that the cam switch 273 shown in FIGURE 5 is reset at the end of one machine cycle. Resetting cam switch 273 disables silicon controlled rectifier 272 shown in FIGURE 5, to await a further error signal Va from the AND gate 260. The cam switch 273 may be installed on the cam arrangement 404; however, other possible locations would be equally effective.

Figure 8:
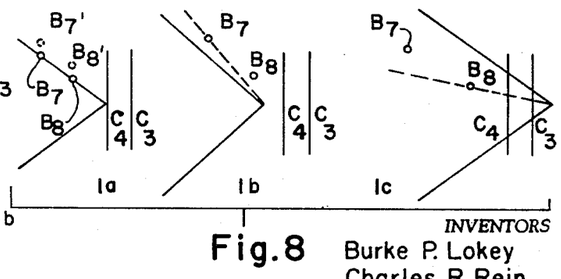
FIGURE 8 is an enlarged view of various bag positions within one of the inspection photocell units of FIGURE 1.

Summary as illustrated in FIGURE 8

Now that the description of the photocell unit together with its electrical operation has been given, the following features relating to the photocell arrangement should be mentioned: sensitivity, positioning, adjustability and adaptability.

As to sensitivity, the dynamic sensing features of the system allow error signals to be generated in a plurality of zones. That is, the error signals are generated prior to the bag arriving in the predetermined reading zone, and also error signals are generated subsequent to the bag leaving the predetermined reading zone. In this manner, fold material that extends over the boundary of an ideal fold or flap is sensed, and also voids formed by the fold material not extending to the boundary of the ideal or true fold is sensed. A specific example with reference to the enlarged view of the photocell arrangement at inspection station 16a is seen in FIGURE 8 with solid lines indicating a true fold. Quite clearly in 8a it can be seen that the leading error photocells B7 and B8 will be initiated when the bag arrives in the predetermined reading zone and therefore no error output signal will be generated. In the second sequence, the dotted line indicates the extent to which a malformed fold or crease has been extended over the desired or true fold. Prior to reaching the reading zone, the dotted line will darken the photocell B7 and hence, an error signal will be generated. Similarly, in the third sequence, the dotted line indicates the amount of void created by an improperly formed fold, thus not extending to the desired or true fold. In this instance, the photocells B7 and B8 will not be energized prior to the arrival of the bag at the predetermined reading zone. Nonetheless, as the bag leaves the predetermined reading zone, it can be seen that photocell B8 becomes darkened, thus producing an error signal which is indicative of a malformed bag flap. Consequently, the dynamic sensing circuit produces error signals whenever there is either an excess of material or a void of material.

As to the adjustability or tolerance capability of the system, a specific example relating to the sensing circuitry for the forward portion of the bag will now be given with reference to FIGURE 8. Photocells B7 and B8 are shown schematically located on the ideal or absolute desired boundary line. In the first sequence, it can be appreciated that no tolerance provisions have been made in the event that the fold being sensed by photocells B7 and B8 is slightly erroneous. That is, in the event that photocells B7 and B8 become darkened an instant prior to the arrival of the bag in the predetermined reading zone, an error signal will be generated. In order to provide for a tolerance setting, the photocells B7 and B8 may be positioned outwardly from their true or absolute setting, as shown only in the first sequence. This has been indicated in FIGURE 8a by the photocells B7' and B8' spaced outwardly from the ideal position of B7 and B8. In the event that the bag flap deviates only slightly from its exact or true position, the photocells B7' and B8' will be darkened only when the bag has arrived in the predetermined reading zone, but not before. Similarly, the positions of the photocells B7' and B8' from their ideal location also provide tolerance limitations after the bag has passed through the predetermined reading zone. Also, the photocells B7 and B8 should be spaced apart from each other a sufficient distance so as not to defeat the purpose of having more than one photocell; that is, a mutually exclusive operation is desired.

As to the adjustability of the system, it is appreciated that a high degree of sensitivity can be attained with a minimal number of photocell and lamp units. As a practical matter, this provides for a decided advantage since alignment problems are aggravated as the number of photocell and lamp units are increased. A saving in time and labor as well as increased working space are but a few of the advantages obtained by reducing the number of photocell and lamp units.

As to the adaptability of the system, it can be seen that various sizes, shapes, and weights of material may be handled in the receptacle or bag forming process as a result of the adjustability and sensitivity features mentioned above. The number of photocell units and their locations to a great extent is determined by the form of the fold, the type of material, or the weight of the material.

While the invention has been described it will be understood that it is capable of further modifications and this application is intended to cover any variations, uses or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

Having thus described the invention, what is claimed is:

1. A bag making apparatus comprising:
   (a) means for folding a plurality of bags into a predetermined shape,
   (b) means for inspecting said bags after folding,
   (c) means for performing an additional process to said bags after folding, and
   (d) means connecting said inspecting means to said additional performing means for rendering said additional performing means inactive.

2. A bag making apparatus as defined in claim 1 including a control sensing means and a memory means between said inspecting means and said additional performing means.

3. A bag making apparatus as defined in claim 1 including means for storing the output from said inspecting means and means for sorting said bags in response to a signal from said storing means.

4. A bag making apparatus as defined in claim 3 including means for moving said bags through said apparatus, said storing means being connected and synchronized with said moving means.

5. A bag making apparatus as defined in claim 1 wherein said additional performing means includes means for pasting said bags along their folded portions.

6. A bag making apparatus as defined in claim 1 including further forming means positioned after said inspecting means, a second means for inspecting said bags subsequent to said further forming means, and means for sorting said bags connected to both of said inspecting means.

11

7. A bag making apparatus as defined in claim 1 wherein said inspecting means includes a plurality of transducers including at least one control transducer and at least one error transducer.

8. A bag making apparatus as defined in claim 7 wherein said transducers are photoelectric.

9. A bag making apparatus as defined in claim 7 wherein said transducers are responsive to the passage of a malformed bag and generate an error signal.

10. A bag making apparatus as defined in claim 9 wherein said transducers are located at an inspecting station and are operable to generate said error signal intermittently while a bag is positioned within said inspection station.

11. A bag making apparatus as defined in claim 1 wherein said inspecting means includes:
(a) at least two control transducers,
(b) at least one error detecting transducer,
(c) said control transducers being spaced from one another along the direction of movement of said bags,
(d) said connecting means including means for controlling said additional performing means, and
(e) said transducers being connected to said controlling means.

12. A bag making apparatus as defined in claim 11 wherein said controlling means is disabled when a forward portion of said bag is located between said control transducers, and said controlling means being operable at other times.

13. A bag making apparatus as defined in claim 11 wherein a line connecting said error detecting transducer and one of said control transducers is positioned at an angle to a line trasverse to the movement of said bags and a line along the movement of said bags.

14. A bag making apparatus as defined in claim 13 including means for varying the tolerance of said inspecting means.

15. A bag making apparatus as defined in claim 11 including means for varying the time said controlling means is disabled.

16. A bag making apparatus as defined in claim 1 wherein said additional performing means includes means for pasting said bag subsequent to said inspecting means.

17. A bag making apparatus as defined in claim 1 wherein said inspecting means includes a plurality of light sensitive means and a plurality of light sources cooperating with said light sensitive means.

18. A bag making apparatus as defined in claim 1 including a reflecting surface positioned in the path of said bags, a portion of said bags being moved over said reflecting surface and another portion of said bags moving under said reflecting surface.

19. A bag making apparatus as defined in claim 18 including an energy projecting means directed toward said reflecting surface, and an energy receiving transducer adapted to receive the output from said energy projecting means after reflection off said reflecting surface.

20. A bag making apparatus as defined in claim 19 wherein said energy projecting means is a light source and said energy receiving transducer is a photoelectric means.

21. A control circuit comprising:
(a) control means for producing a disabling signal during a predetermined time period, and an enabling signal at all other times,
(b) sensing means for producing an output pulse at any time,
(c) logic means responsive to said control means and said sensing means for producing an error signal only during said all other times.

22. The combination as set forth in claim 21 wherein said control means and said sensing means include light means and photoconductive means selectively responsive to said light means.

12

23. The combination as set forth in claim 21 including memory means selectively responsive to said logic means for synchronously advancing said error signal.

24. The combination as set forth in claim 23 including cam cycling means connected to said memory means for synchronously advancing said signal to generate a control signal.

25. A bag inspection and control system for examining the leading and lagging edges of a plurality of bag folds moving through an inspection station comprising:
(a)(1) a source of voltage,
(a)(2) a plurality of error lag light means,
(a)(3) a plurality of error lag photoconductive means connected to said source of voltage and in operative relationship with said plurality of error lag light means,
(a)(4) first pulse producing means connected to said plurality of error lag photoconductive means,
(a)(5) said plurality of error lag photoconductive means operative to generate only an output pulse of a first state from said first pulse producing means only when said error lag photoconductive means pass from a first level of illumination to a second level of illumination,
(b)(1) a plurality of error lead light means,
(b)(2) a plurality of error lead photoconductive means connected to said source of voltage, and in operative relationship to said plurality of error lead light means,
(b)(3) a second pulse producing means connected to said plurality of error lead photoconductive means,
(b)(4) said plurality of error lead photoconductive means operative to generate only an output pulse of said first state from said second pulse producing means only when said error lead photoconductive means pass from said second level of illumination to said first level of illumination,
(c)(1) a first and a second control photoconductive means,
(c)(2) control light means connected to said source of voltage and operative to illuminate said first and second control photoconductive means in a plurality of different combinations of said first and second level of illumination,
(c)(3) a network means connected to said first and second control photoconductive means for producing a disabling signal of only said second state when said first and second control photoconductive means are illuminated in only a predetermined one of said plurality of different combinations, and for producing an enabling signal of only said first state when said first and second control photoconductive means are illuminated in only the other of said plurality of different combinations,
(d)(1) logic means having a first and a second input terminal and an output terminal,
(d)(2) means for connecting said output pulse of a first state from said first and second pulse producing means to said first logic means input terminal,
(d)(3) means for connecting said disabling output signal of said second state and said enabling signal of said first state to said second logic means input terminal, and
(d)(4) means connected to said logic means output terminal for generating a control signal only when both said first and second logic means input terminals are energized in said first state.

26. The combination as set forth in claim 25 wherein said means connected to said logic means output terminal is a memory unit including silicon controlled rectifiers.

27. A control system comprising:
(a) a first energizing means,
(b) first energy responsive means in operative relationship with said first energizing means, (c) a first pulse producing means connected to said first energy responsive means, (d) said first energy responsive means operative to generate an output pulse of a first state from said first pulse producing means when said first energy responsive means changes from a first level to a second level, (e) first and second control energy responsive means, (f) control energizing means operative to switch said first and second control energy responsive means to a plurality of different combinations of said first and second levels, (g) a network means connected to said first and second control energy responsive means for producing a disabling signal of said second state when said first and second control energy responsive means are switched to a predetermined one of said plurality of different combinations, and for producing an enabling signal of said first state when said first and second control energy responsive means are switched in the other of said plurality of different combinations.

28. A control system as defined in claim 27 including a logic means having at least a first and a second input terminal and an output terminal, said logic means being responsive to said first and second states for producing a control signal at said output terminal when both of said first and second logic means input terminals are simultaneously in said first state.

29. The combination as set forth is claim 28 wherein said first logic means input terminal is connected to said first pulse generating means, and also to a circuit for producing pulses of said first state comprising:

(a) second energizing means, (b) second energy responsive means in operative relationship to said second energizing means, (c) a second pulse producing means connected to said second energy responsive means, (d) said second energy responsive means operative to generate an output pulse of a first state from said second pulse producing means when said second energy responsive means goes from said second level to said first level, and wherein said enabling and disabling signals from said network means are connected to said second logic means input terminal.

30. The combination as set forth in claim 28 including a memory unit connected to said logic means.

31. The method of inspecting and controlling the manufacture of bags comprising:

(a) moving a series of bags through an inspection station, (b) sensing the presence and absence of bag material, (c) indicating the presence and absence of bag material.

32. The method defined in claim 31 further including:

(d) storing the information indicated in step (c), and (e) using said information and controlling subsequent operations in said manufacture of bags.

33. The method defined in claim 31 including sensing the presence and absence of bag material at all times and disabling said indicating step at a predetermined time during the movement of said bags.

34. A bag making apparatus as defined in claim 1 including means for detecting the presence and absence of bag material.

References Cited

UNITED STATES PATENTS

| | | | |
|---|---|---|---|
| 3,206,665 | 9/1965 | Burlingham | 307—217 XR |
| 3,374,714 | 3/1968 | Berghgracht | 93—8 |

BERNARD STICKNEY, *Primary Examiner.*

U.S. Cl. X.R.

34—146.1; 307—217; 315—18; 178—7.7